April 11, 1944.  K. H. KRAUSE  2,346,436

BRACING DEVICE FOR GRAIN DRILL HOPPERS

Filed May 2, 1940

INVENTOR.
KARL H. KRAUSE
BY
ATTORNEY

Patented Apr. 11, 1944

2,346,436

UNITED STATES PATENT OFFICE 2,346,436

BRACING DEVICE FOR GRAIN DRILL HOPPERS

Karl H. Krause, Toronto, Ontario, Canada, assignor to Massey-Harris Company, Ltd., Toronto, Ontario, Canada, a limited company of Canada Application May 2, 1940, Serial No. 332,942

1 Claim. (Cl. 220—71)

The present invention relates to grain drill hoppers and particularly the larger sizes.

An object of the present invention is to provide a hopper which may be made from the standard sheet metal used for the purpose and having means whereby the hopper is held against twisting strains without adding more than nominally to its weight and cost and without detracting from its appearance and utility.

In grain drill hoppers of the class having large openings for their length and being made from thin sheet steel, very little resistance is offered to torsional strains. When twisted, the lid will not fit and the appearance of the drill is greatly impaired.

The principle involved is somewhat on the lines of a seamless pipe as compared to a pipe with a seam which has not been welded. The seamless pipe offers great resistance against torsional strains whereas the seamed pipe offers very little resistance to torsional strains.

In grain drill hoppers, the opening cannot be dispensed with. I therefore provide bracing means within the hopper which greatly strengthen the hopper against torsional strains and do not detract from the appearance of the hopper.

I accomplish the foregoing objects by means of a number of longitudinally spaced braces which lie across the hopper at an acute angle, the adjacent ends being in transverse alignment to the hopper and having brace members therebetween. The braces are secured to the side walls of the hopper and positioned at a considerable distance above the bottom of the hopper so as to make the hopper rigid. The braces preferably are located far enough below the top of the hopper so as not to interfere while the hopper is being filled with grain from a sack or otherwise.

To these and other useful ends, my invention consists of parts, combinations of parts, or their equivalents, as hereinafter set forth and claimed and shown in the accompanying drawing in which:

Figure 2:
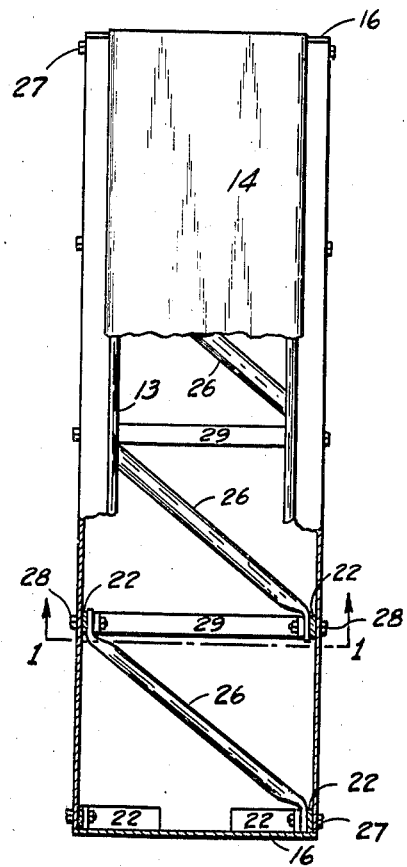
Fig. 2 is a top view of the hopper having portions cut-away so as to show the fastenings of the braces.
Figure 1:
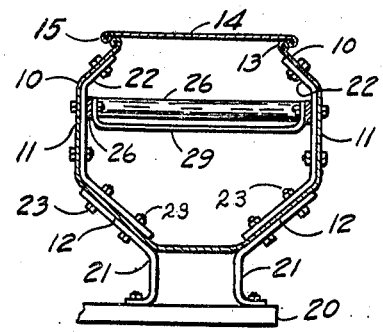
Fig. 1 is a transverse sectional view of a conventional hopper equipped with the preferred form of my invention taken on line 1—1 of Figure 2.

As thus illustrated, the hopper comprises side panels and a bottom preferably shaped as illustrated in Figure 1. The side panels are formed into three uniform portions 10, 11 and 12 and the bottom being formed as illustrated.

An inlet opening 13 is provided which is adapted to be closed by means of a lid 14, the lid being hinged to the front edge of the hopper as at 15. The end members of the hopper are designated by reference numeral 16—16. It is customary to place spaced outlets (not shown) in the bottom of the hopper these outlets forming inlet connections to the grain metering or feed valves (not shown).

Numeral 20 designates a fragmentary portion of the drill frame on which the grain hopper is mounted by means of brackets 21—21. These brackets are shaped and secured to members 20 and 12 as illustrated.

I provide stiffening braces 22—22 on the interior of the hopper as illustrated, the lower end registering with the upper ends of members 21 and being held thereto and to the hopper by means of spaced bolts 23. Thus as illustrated, the hopper will be spaced a distance above member 20 but securely attached thereto.

I provide a number of longitudinally spaced brace members 26, one at each end of the hopper being secured to a member 22 by bolts 27—27. Members 26 are longitudinally spaced so their adjacent ends are in transverse alignment and contact members 22 with their ends secured thereto as illustrated by bolts 28 and to braces 29.

Braces 26 are preferably made from tubing and being flattened and shaped at their ends as illustrated. Members 29 are preferably made from flat stock and shaped as illustrated in Figure 1. As illustrated in this figure, the braces are positioned between the top edges of members 11, this being a considerable distance from the bottom of the hopper. Members 26 and 29 will cooperate to thereby accomplish the desired results.

In very long hoppers, two lids may be supplied. The number of braces used in a hopper is determined by the length of the hopper. The drawing, as a matter of convenience illustrates a comparatively short hopper. In long hoppers, two lids similar to 14 are necessary and a cross member 44 is supplied over which the adjacent edges of the lids rest.

It will be seen that I have provided efficient bracing means for a grain drill hopper which will hold it against torsional strains. Clearly my improved braces may be applied to hoppers of any shape and the braces may be differently positioned, for example, near the top of the opening in the hopper.

It will be seen that many minor detail changes may be made without departing from the spirit and scope of the present invention as recited in the appended claim.

Having thus shown and described my invention, I claim:

An elongated grain drill hopper of the class described, having an opening at its top for substantially its length for the reception of grain, one or more hinged lids adapted to cover said opening, the side panels of said hopper being uniform for their length, a bottom portion thereof diverging upwardly and a top portion converging upwardly, bracing means secured to said side members at substantially the widest space therebetween, said bracing means comprising a number of spaced diagonally arranged bars being positioned so adjacent ends are in substantial transverse alignment, cross bars forming a connection between said adjacent ends.

KARL H. KRAUSE.